United States Patent [19]
Röhm

[11] Patent Number: 5,765,839
[45] Date of Patent: Jun. 16, 1998

[54] HAMMER-DRILL CHUCK

[76] Inventor: Günter Horst Röhm, Heinrich-Röhm-Strasse 50, D-89567 Sontheim, Germany

[21] Appl. No.: 553,797

[22] Filed: Oct. 23, 1995

[30] Foreign Application Priority Data

Oct. 31, 1994 [DE] Germany ............... 44 38 991.4
Apr. 10, 1995 [EP] European Pat. Off. .......... 95105379

[51] Int. Cl.$^6$ .................................................. B23B 31/12
[52] U.S. Cl. .......................... 279/62; 279/60; 279/140; 279/902
[58] Field of Search ........................ 279/60–65, 140, 279/902

[56] References Cited

U.S. PATENT DOCUMENTS

| | | | |
|---|---|---|---|
| 3,970,323 | 7/1976 | Schnizler, Jr. ............... | 279/64 |
| 4,302,021 | 11/1981 | Rohm ............... | 279/60 |
| 5,435,578 | 7/1995 | Rohm ............... | 279/62 |

*Primary Examiner*—Steven C. Bishop
*Attorney, Agent, or Firm*—Herbert Dubno; Andrew Wilford

[57] ABSTRACT

A drill chuck has a body provided centered on an axis with an annular array of teeth and a plurality of jaws radially displaceable relative to the body between inner and outer positions. A tightening ring is axially fixed but rotatable about the axis on the body in a tightening direction and in an opposite loosening direction and a pair of screwthread formations between the tightening ring and the jaws move the jaws radially together on rotation of the tightening ring in the tightening direction and radially apart on rotation of the tightening ring in the loosening direction. A locking member engageable with the teeth and angularly fixed on the tightening ring is radially displaceable between a locking position engaging the teeth and preventing rotation of the body in the loosening direction and a freeing position permitting free rotation of the body relative to the tightening ring. A setting ring angularly displaceable on the tightening ring is formed with a pair of angularly spaced and radially open seats. A pair of angularly spaced abutments between the setting ring and the tightening ring limit angular movement of the sleeve on the ring. A cam on the setting ring is engageable with the locking member for displacing the locking member into the locking position when the setting ring is in one of its end positions and for displacing the locking member into the freeing position when the setting ring is in the other of its end positions.

20 Claims, 15 Drawing Sheets

HAMMER-DRILL CHUCK

FIELD OF THE INVENTION

The present invention relates to a drill chuck. More particularly this invention concerns a chuck used on a hammer drill.

BACKGROUND OF THE INVENTION

A standard drill chuck has a chuck body that is adapted to be mounted on a drill spindle and that carries a plurality of jaws clampable on a bit engageable in an end of the chuck. A tightening ring is coupled to the jaws to move them in and out and thereby open and close the chuck. A locking system between the ring and the body comprises an annular array of teeth with differently angled flanks against which a spring presses a locking member so that when the ring is rotated in a closing or tightening direction on the body the member slides over the teeth and allows this rotation but blocks opposite rotation in an opening or loosening direction. A setting ring rotatable on the chuck between end positions defined by respective abutments is coupled to the member such that when the setting ring is rotated into one end position it pulls the member out of engagement with the teeth, whereas in the other end position the member engages the teeth. A spring-loaded latching means is provided to releasably secure the setting ring in each of its end positions.

Thus such a chuck, which is described in German patent document 2,341,642 and in U.S. Pat. No. 5,435,578, can be tightened simply by rotating the tightening ring in the closing or tightening direction on the chuck body, with the locking member ratcheting over the teeth. To open or loosen the chuck the setting ring must be turned to the release position to allow the tightening ring to be rotated in the opening direction. Thus opening the chuck requires that two elements, first the setting ring and then the tightening ring, be manipulated. Furthermore the need for these two individually manipulable elements means that both these elements must be exposed on the exterior of the chuck, so that neither can be very large and in fact operating the one and not the other can be particularly difficult for some users. In any case such chucks must be manipulated with two hands for closing on or releasing a tool bit.

OBJECTS OF THE INVENTION

It is therefore an object of the present invention to provide an improved drill chuck.

Another object is the provision of such an improved drill chuck which overcomes the above-given disadvantages, that is which is easy to use, even with one hand.

SUMMARY OF THE INVENTION

A drill chuck has according to the invention a chuck body rotatable about a chuck axis and provided centered on the axis with an annular array of teeth each having a steep flank and a shallow flank and a plurality of jaws angularly spaced on the body about the axis and radially displaceable relative to the body between inner and outer positions. A tightening ring is axially fixed but rotatable about the axis on the body in a tightening direction and in an opposite loosening direction and a pair of screwthread formations between the tightening ring and the jaws move the jaws radially together on rotation of the tightening ring in the tightening direction and radially apart on rotation of the tightening ring in the loosening direction. A locking member engageable with the teeth and angularly fixed on the tightening ring is radially displaceable between a locking position engaging the teeth and preventing rotation of the body relative to the tightening ring in the loosening direction and a freeing position permitting free rotation of the body relative to the tightening ring in both directions. A setting ring axially fixed but angularly displaceable on the tightening ring is formed with a pair of angularly spaced and radially open seats. A pair of angularly spaced abutments between the setting ring and the tightening ring limit angular movement of the sleeve on the ring to movement between a pair of end positions of the sleeve on the ring. A cam on the setting ring is engageable with the locking member for displacing the locking member into the locking position when the setting ring is in one of its end positions and for displacing the locking member into the freeing position when the setting ring is in the other of its end positions. A latch member angularly fixed on the tightening ring is engageable in the seats of the setting ring for releasably retaining the setting ring in its end positions. A common spring extending angularly along and fixed angularly in the tightening ring urges the latch member into the seats and the locking member into the freeing position.

With this system the setting ring or sleeve serves both to position the locking member and to rotate the locking ring. When tightening the chuck, the setting ring merely rotates the tightening ring with the locking member ratcheting or sliding over the shallow backs of the sawteeth of the chuck body. When loosening, the setting ring at first rotates relative to the tightening ring to pull the locking member out of engagement with the teeth and subsequent backward rotation of the setting ring entrains the locking ring and opens the chuck. Thus the setting ring or sleeve can in fact constitute the entire outside surface of the chuck, making it extremely simple to handle. The locking feature of the chuck is automatic, that is the chuck is automatically locked when tightened and automatically unlocked when loosened.

According to a feature of the invention the locking ring is formed directly with one of the screwthread formations and includes a sleeve carrying the common spring and engageable directly with the abutments. This locking ring is formed of at least two part-circular pieces joined together and fixed to the locking-ring sleeve.

One of the rings can be formed with at least one secantal flat and the other ring can be formed with a radial projecting having opposite flanks forming the abutments and engageable with the flat. Alternately one of the rings is formed with a radially open notch having ends forming the abutments and the other ring has a projection extending into the notch and engageable with the ends thereof. The projection can extend axially or radially from the locking ring. The notch can be formed as a window in the tightening ring.

In accordance with this invention the common spring has one end forming the locking member. More particularly the common spring has a pair of lateral projections one of which is adjacent the locking-member end and engageable with the cam and the other of which is engageable in the seats. The spring is formed as a single strip of spring steel, of uniform width and thickness. The rings together form an angularly extending space holding the spring and the tightening ring is formed with a radially throughgoing window through which the locking member extends to engage the teeth. This space prevents the spring from tipping. The locking ring can form a flange extending in a plane perpendicular to the axis and formed with a window through which the locking member engages. The window has edges constituting the abutments. It is also possible for the rings to form at the teeth an angularly extending space in which the spring is lodged. The spring is tensioned to bear at its ends inward on the body, at its projections outwardly on the setting ring, and centrally between its ends outwardly on the setting ring. When the locking ring has an axially extending sleeve formed with windows through which the projections extend these formations angularly couple the spring to the locking ring. The spring is formed centrally between its ends with another projection and the locking-ring sleeve has another such window snugly surrounding the central projection. The space extends annularly around the chuck body and a clip fixed on the locking-ring sleeve angularly offset from the spring is engaged in the space.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

As seen in FIGS. 1 through 4B, a chuck according to the invention has a chuck body 1 centered on an axis 3 and formed with an axially rearwardly open threaded bore 2 that is normally fitted on a drive-unit spindle. Three angularly equispaced jaws 5 are axially and radially displaceable in a front tool recess 4 of the chuck 1 to grip an unillustrated tool bit and rotate it about the axis 3. A tightening ring 8 rotatable on the chuck body 1 about the axis 3 has an internal screwthread 7' that meshes with external rows of teeth 6 on the backs of the jaws 5 so that when it is rotated on the body 1 in a tightening direction 15 it brings the jaws 5 forward and together, and when oppositely rotated in a loosening direction 14 it moves them oppositely. The tightening ring 8, which is formed in two parts, bears axially backward via a roller bearing 22 on a snap ring 21 set in the body 1 so that it is axially fixed thereon.

A locking mechanism 11 is provided to prevent the tightening ring 8 from rotating in the opening direction 14 on the chuck body 1 except when this is intentionally desired. This mechanism comprises an annular array of sawtooth formations 10 on the chuck body 1 and a locking member 12 angularly fixed to the tightening ring 8. The teeth 10 each have a steep flank 13' directed back against the opening or loosening direction 14 and a shallow flank 13' so that the member 12 can be cammed out and ratchet over it when moving in the tightening direction 15. This locking member 12 is moved between a freeing position shown in FIG. 4A permitting the tightening ring 8 and body 1 to rotate relative to each other in either direction 14 or 15 and a locking position shown in FIG. 4B which only allows the tightening ring 8 to rotate in the tightening direction 15 on the body 1, ratcheting on the shallow back flanks 13" as described above. This movement is the responsibility of a cam 35 formed on a setting ring or sleeve 9 that covers almost the entire exterior of the chuck and that is rotatable on the body 1 about the axis 3.

More specifically, the setting sleeve 9 can rotate limitedly relative to the tightening ring 8 through an angular stroke defined by abutments 16' and 16". A latch 17 between the setting sleeve 9 and tightening ring 8 comprises a latching member 38" seatable in either of two angularly spaced seats 17' and 17" respectively corresponding to the unlocked and locked positions of respective FIGS. 4A and 4B. A single generally arcuate leaf spring 38 angularly fixed on the tightening ring 8 has an end 36 that forms the locking member 12 and a lateral U-shaped projection that forms the latching member 38" and the spring 38 is shaped to urge both radially outward.

An intermediate thin-walled coupling sleeve 18 has a rear end 18' fixed to the tightening ring 8. The tightening ring 8 is comprised of two halves 18" which are separated at a bore 19 and fixed in the rear end 18', making it possible to assemble the chuck by slipping the two halves 18" into a radially outwardly open groove 20 of the body 1. A cylindrical outer surface 60 of the sleeve 18 slides on a cylindrical inner surface 61 of the setting sleeve 9. A washer-like disk 40 closes the back end of the chuck between the body 1 and the setting sleeve 9. The sleeve 18 has an inwardly directed flange 62 forming a shoulder which sits in an axially backwardly directed shoulder 63 of the setting sleeve 9 and has axially forwardly extending projections 29 that fit in complementarily shaped but angularly longer and inwardly open notches 30 that are cut into the setting sleeve 9 and whose ends form the abutments 16' and 16". These extensions 29 have front ends 64 interconnected by an annularly continuous ring 65 that closely surrounds the nose of the body 1. Tabs 66 project radially outward from the ring 65 and engage over the extreme front end of the setting sleeve 9 to axially fix the two parts 18 and 9 together.

The spring 38 has the outer end 36 whose tip forms the locking member and a pair of outwardly projecting U-shaped formations 38' and 38" the latter of which forms the latching member 38" and the former of which rides on the cam 35 of the setting sleeve 9 to radially displace the locking member 12. These two projections 38' and 38" extend through complementary windows 39' and 39" in the sleeve 18 to couple the spring 38 to the sleeve 18. The spring 38 sits in an annular space 83 defined between the body 1 at its teeth 10 and the setting sleeve 9 whose radial dimension is much larger than the thickness of the spring 38 so that same can move radially. This spring 38 has a central crown part 31 that bears radially outward on the setting sleeve 9 and a pair of legs leading to the projections 38' and 38". An end 71 of the spring 38 opposite the end forming the member 12 bears radially inward on the body 1.

Figure 1:
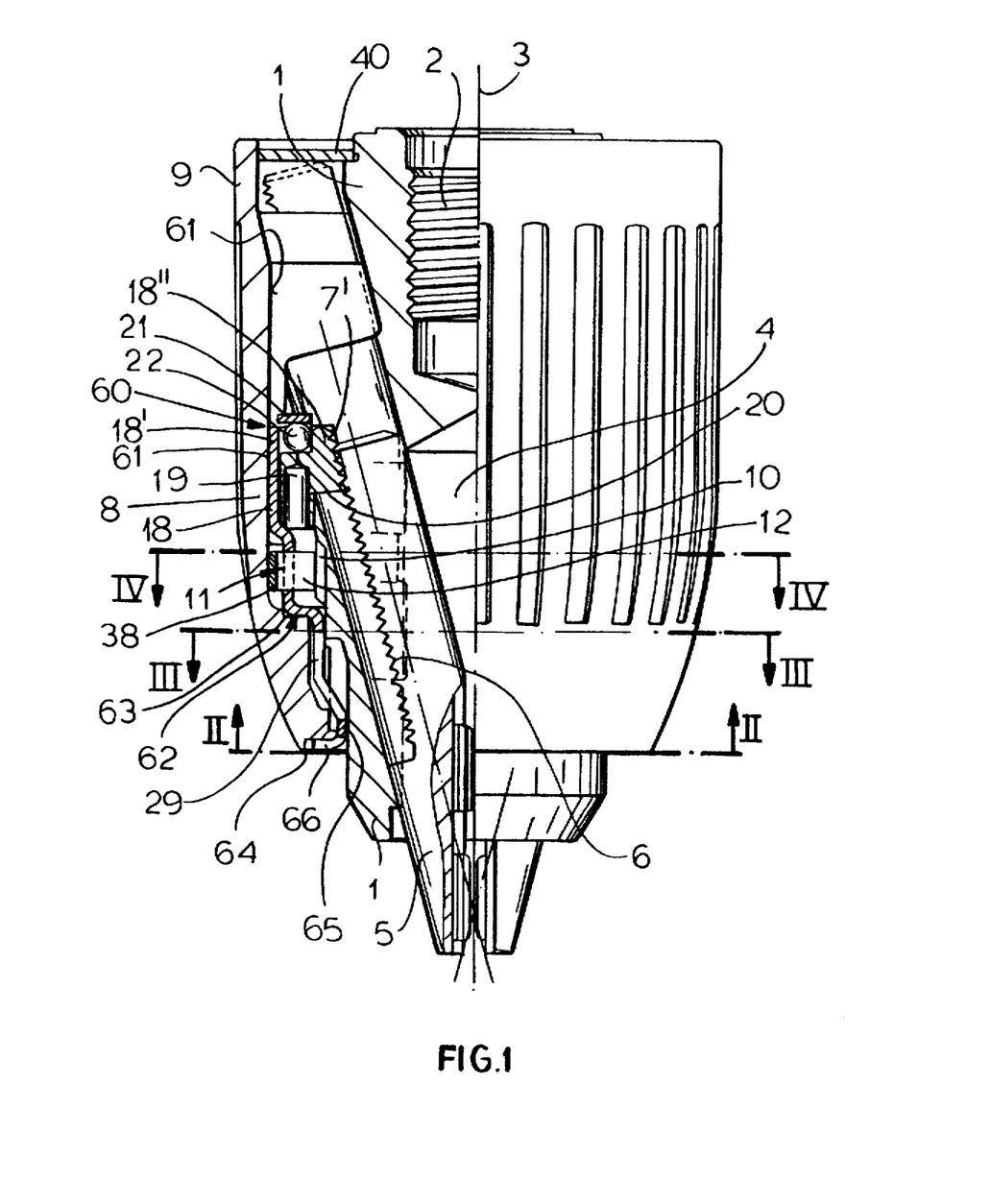
FIG. 1 is a side view partly in axial section through a first embodiment of the chuck according to the invention in the locked position.
Figure 2:
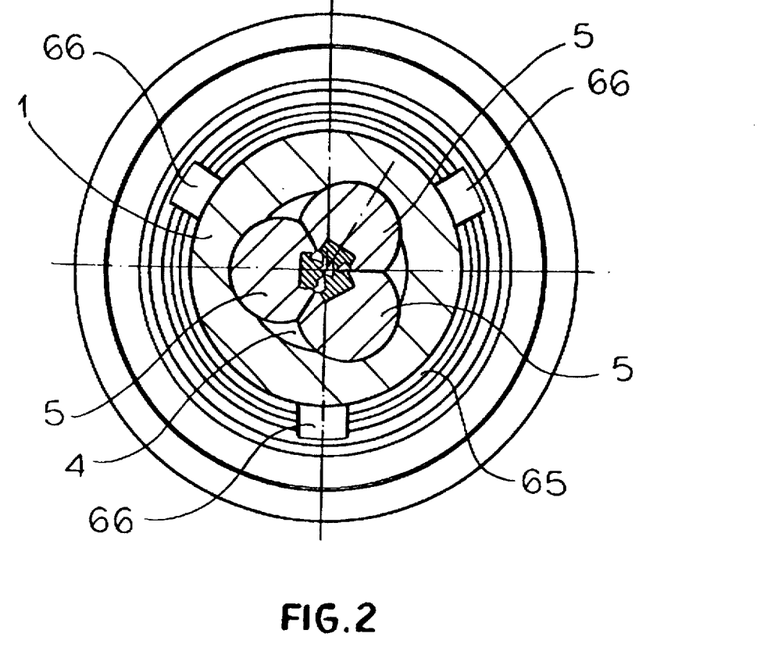
FIGS. 2, 3, and 4A are cross sections taken respectively along lines II—II, III—III, and IV of FIG. 1.
Figure 3:
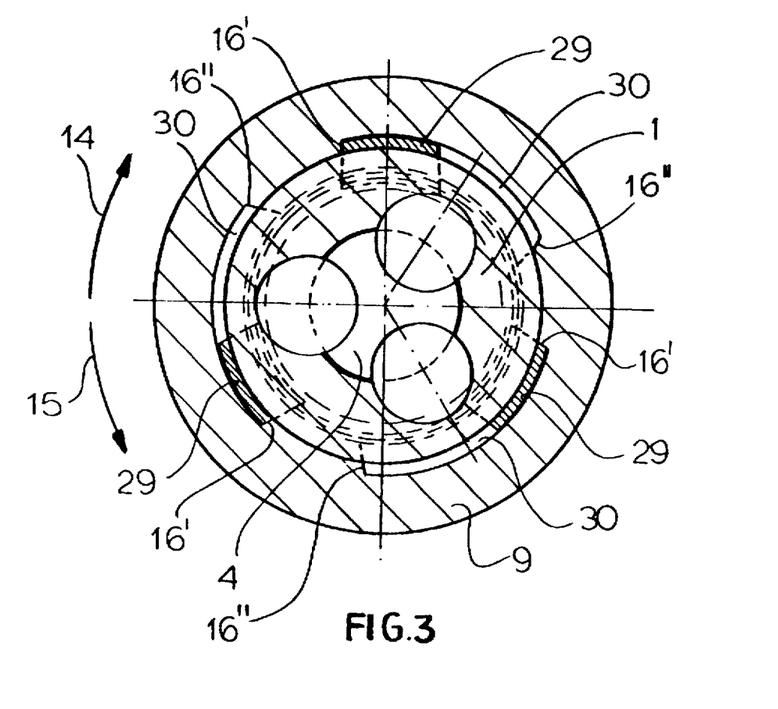

The chuck described above operates as follows:

Assuming the chuck is in the unlocked position of FIG. 1, it is closed or tightened on a tool by rotating the setting sleeve 9 in the direction 15 relative to the body 1, which is normally relatively nonrotatable on the drive-unit spindle. The rotation of the setting sleeve 9 is transmitted by the coupling sleeve 18 to the tightening ring 8 so that the jaws 5 are moved axially forward and radially inward.

Once the jaws 5 engage the tool further rotation of the tightening ring 8 is inhibited so that the setting sleeve 9 will rotate relative to the sleeve 18. This causes the projection 38"to be cammed out of the seat 17" and move into the seat 17', and simultaneously causes the cam 35 to push in the outer end 36 carrying the locking member 12. Further rotation of the setting sleeve 9 will rotate the tightening ring 8 to tighten it on the tool, with the member 12 ratcheting over the shallow back flanks 13" of the teeth 10.

Once the chuck is tightened on the tool bit, forces tending to reverse rotate the tightening ring 8 in the direction 14 to loosen the chuck are effectively countered by engagement of the locking member 12 against the steep flanks 13' of the teeth 10. Meanwhile the setting sleeve 9 remains limitedly rotatable on the chuck body 1 between the end positions defined by the abutments 16'and 16" but is releasably retained in the locked position by engagement of the projection 38" in the seat 17".

To reverse rotate the setting sleeve 9 in the direction 14 it is necessary to exert on it a torque sufficient to cam in the projection 38" so that is shifts from the seat 17" to the seat 17'. This action also brings the cam pocket 35 into alignment with the cam-follower projection 38' so that it moves radially outward and the lock member 12 disengages itself from the teeth 10. Once the projection 38" is in the seat 17' and the projection 29 engages the abutment 16", the setting sleeve 9 is once again coupled to the now freed tightening ring 8 so that further rotation in the loosening direction 14 entrains this tightening ring 8 and retracts the jaws In the arrangement of FIGS. 5 through 8 a cup-shaped metal shield 50 is seated on the front of the chuck, held between a forwardly directed shoulder 51 of the body 1 and a snap ring 52 seated in a groove of the body 1. This shield 50 engages back over the front end of the setting sleeve 9 and protects it from direct engagement with a workpiece, for instance when drilling through a wall when the chuck bumps against the outside wall surface. Such protection is advisable to guard the setting sleeve 9, which typically is made of a durable plastic, from damage, and to avoid that it is tightened too much on the body 1 as it rubs against something while the chuck is rotating.

In addition here the projections 29 are formed integrally with the setting sleeve 9 and project through the windows 30 of a front-end angled skirt 69 (see FIG. 8) of the sleeve 18. The radial inner surface 29' of the projections 29 is set at a spacing from the axis 3 that is at least equal to half the outside diameter of the outside edge 80' of the window edge 80 on the sleeve 18 so that the entrainment formations 29 do not hinder fitting of the setting sleeve 9 on the sleeve 18. Each formation 29 has a radially deflectable nose 81 which engages when the assembly is fitted together behind the axially front edge 80 of the window 3 and thus protects the setting sleeve 9 against axially forward movement.

Figure 9:
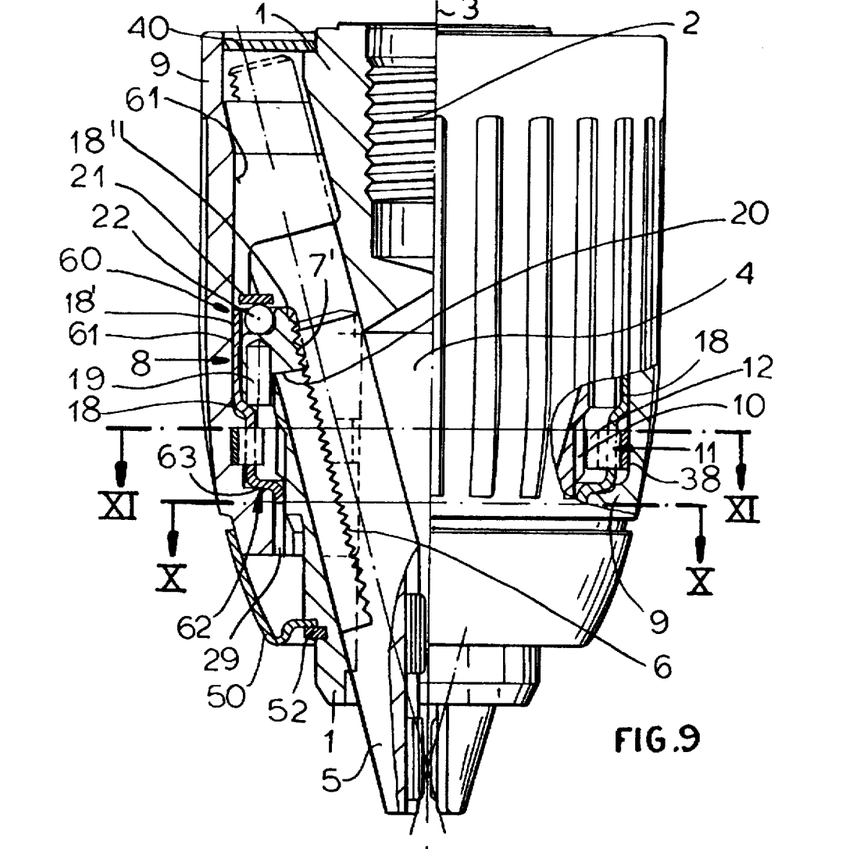
FIG. 9 is a view like FIG. 1 of a third embodiment of the chuck according to the invention.
Figure 10:
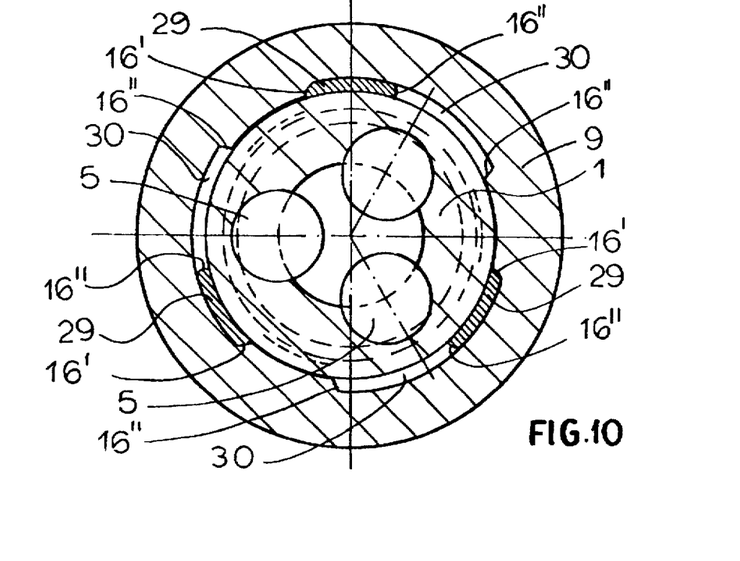
FIGS. 10 and 11A are cross sections taken along respective lines X—X and XI—XI of FIG. 9.
Figure 11A:
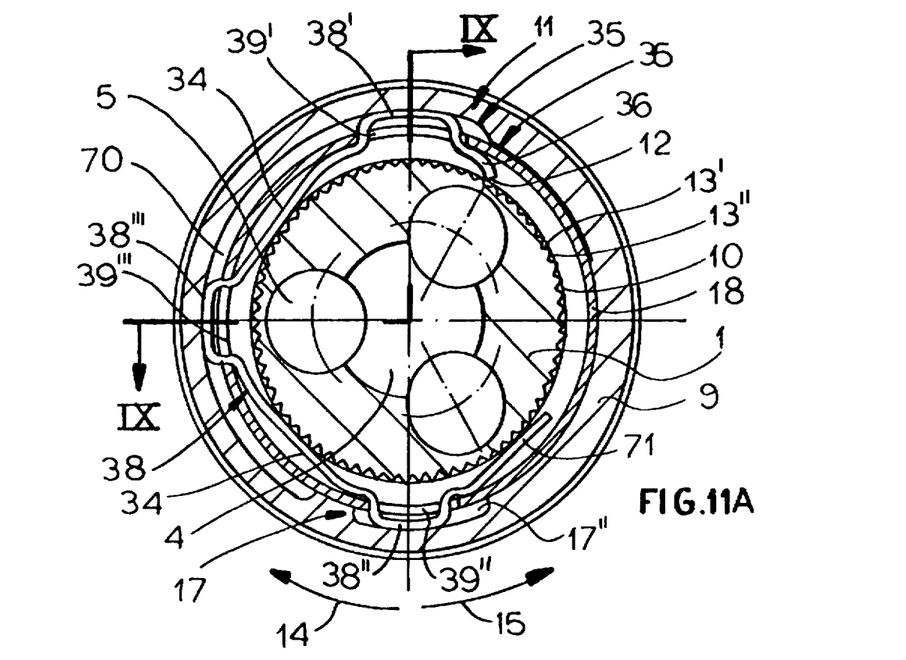
Figure 11B:
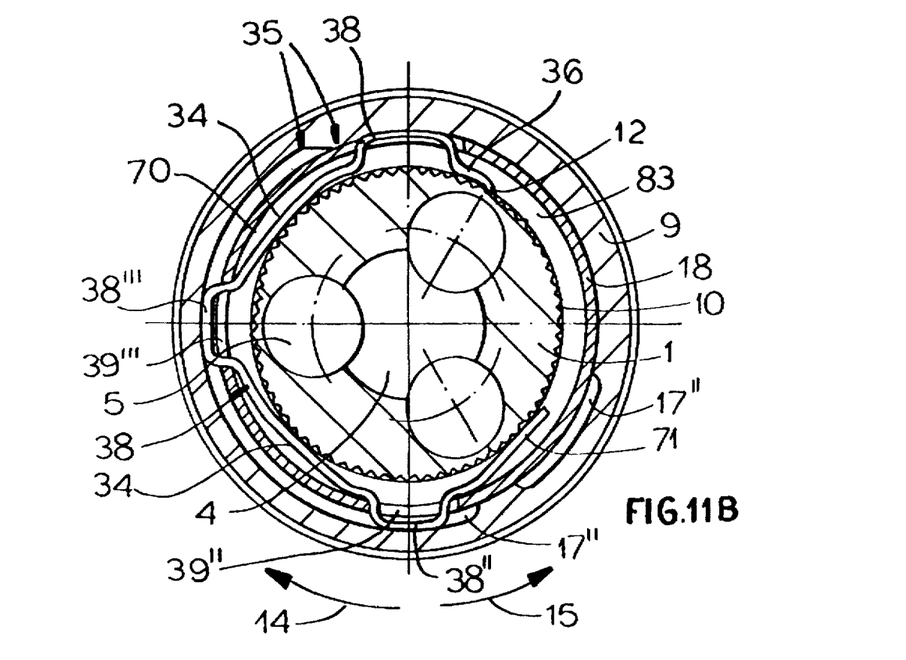
FIG. 11B is a view like FIG. 11A but showing the chuck in the locked position.

The chuck of FIGS. 9 through 11.2 has, instead of the crown part 31, a central outward projection 38'" like the latching projection 38" and cam-follower projection 38' that engages through a complementary window 39'" of the sleeve 18, and the inner wall of the setting sleeve 9 is formed with a radially inwardly open groove 70 in which the projection 38'" rides to axially couple these two parts 38 and 9 together. This structure eliminates the need for the shoulder 63.

Figure 4A:
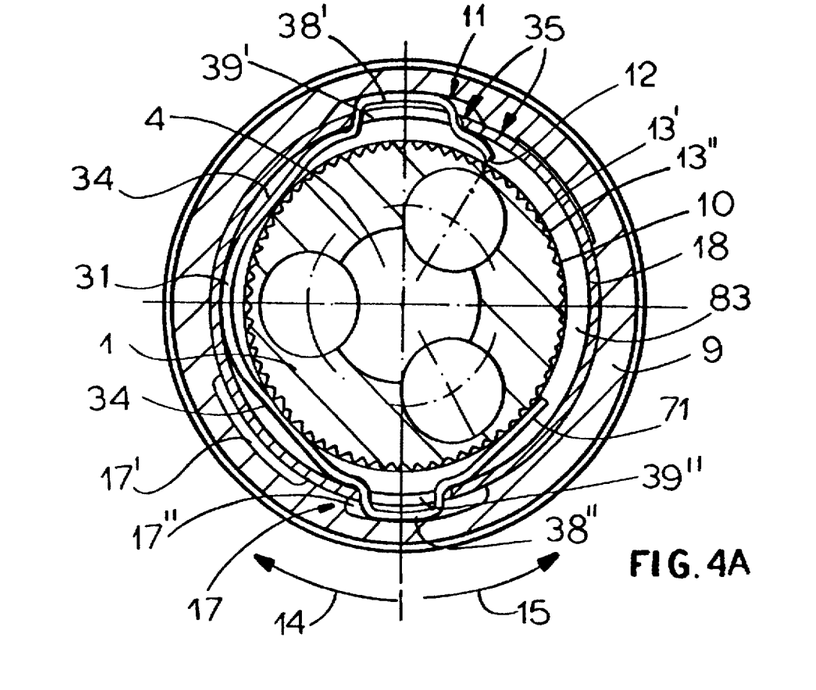
Figure 4B:
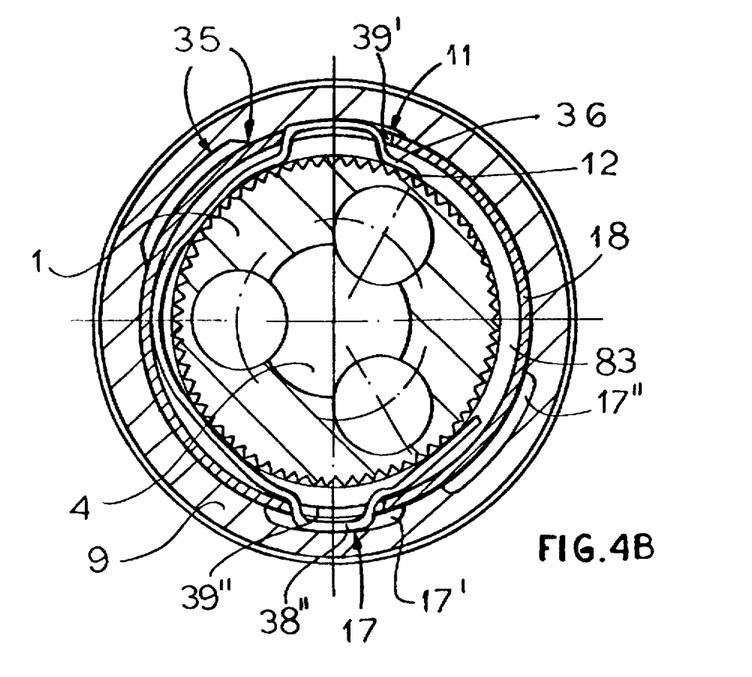
FIG. 4B is a view like FIG. 4A but showing the chuck in the locked position.
Figures 5, 8:
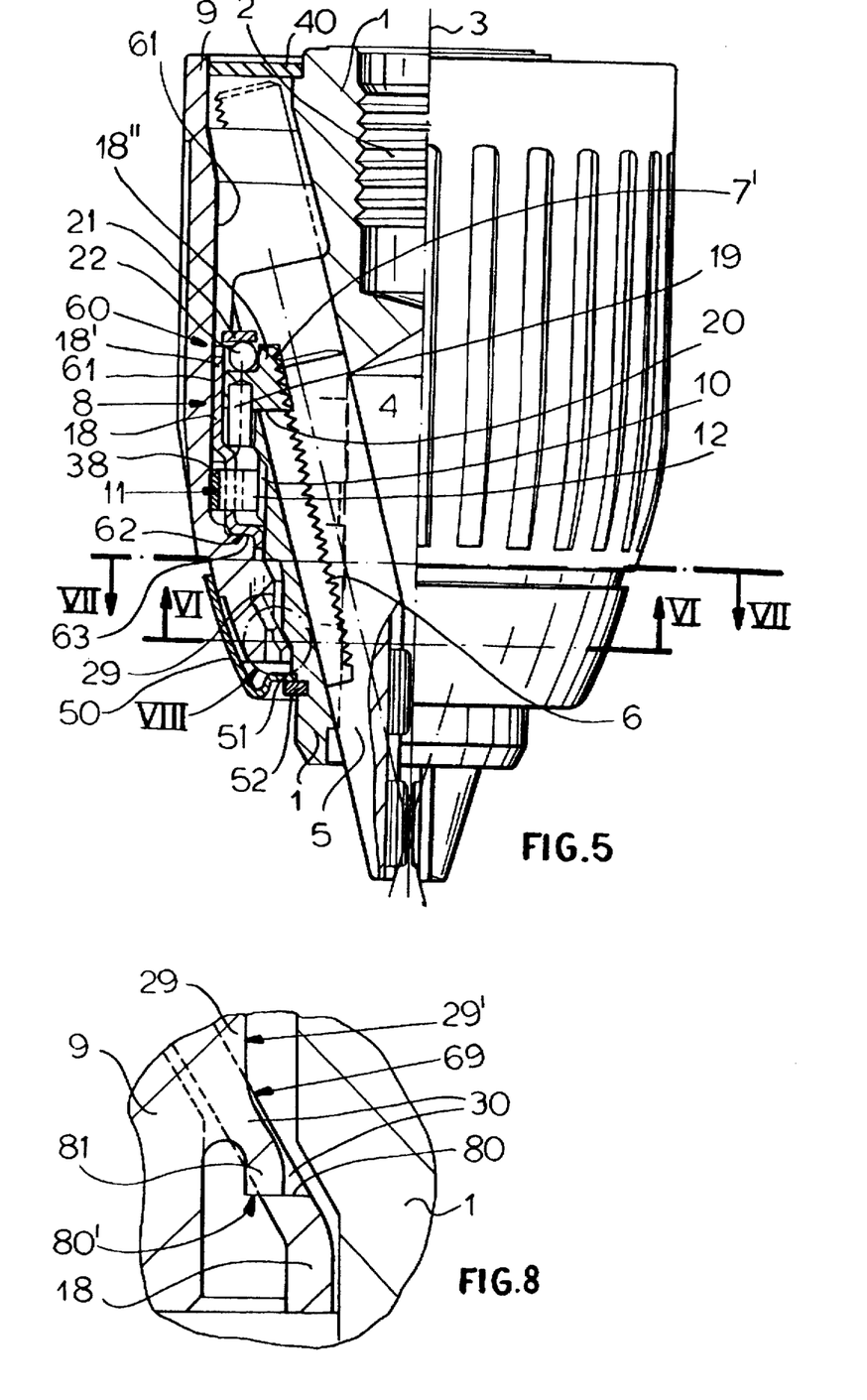
FIG. 5 is a view like FIG. 1 of a second embodiment of the chuck according to the invention.
FIG. 8 is a large-scale view of the detail indicated at VIII in FIG. 5.
Figure 6:
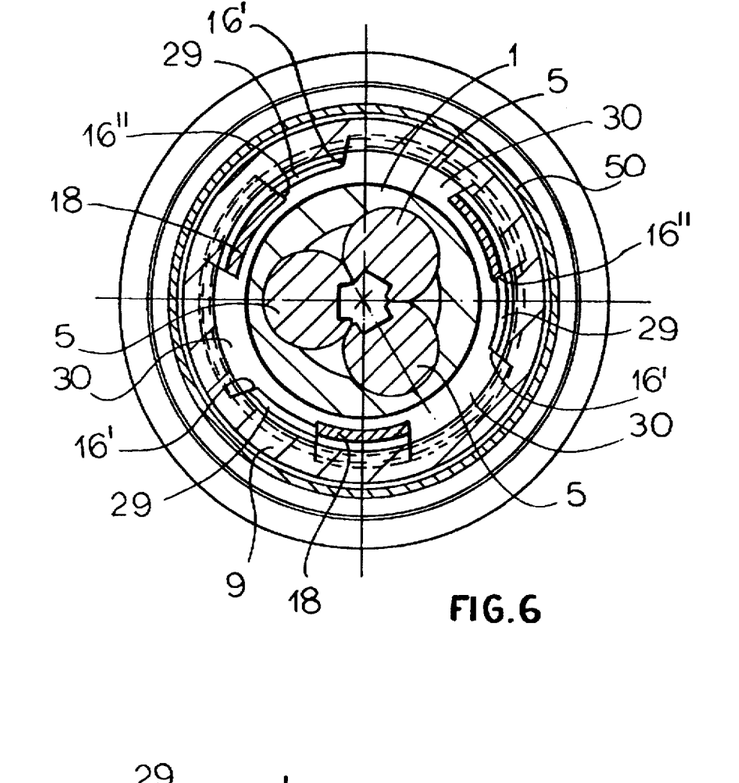
FIGS. 6 and 7 are cross sections taken along respective lines VI—VI and VII—VII of FIG. 5.
Figure 7:
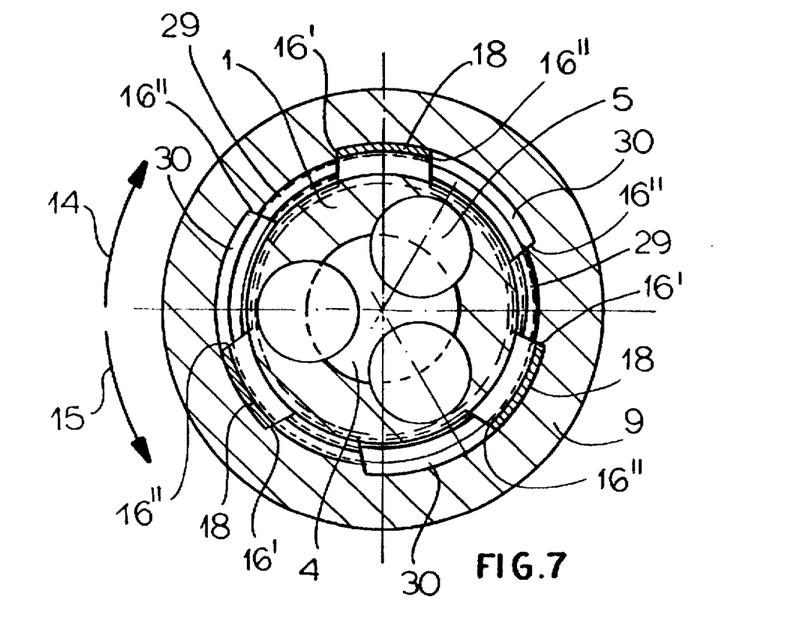
Figure 12:
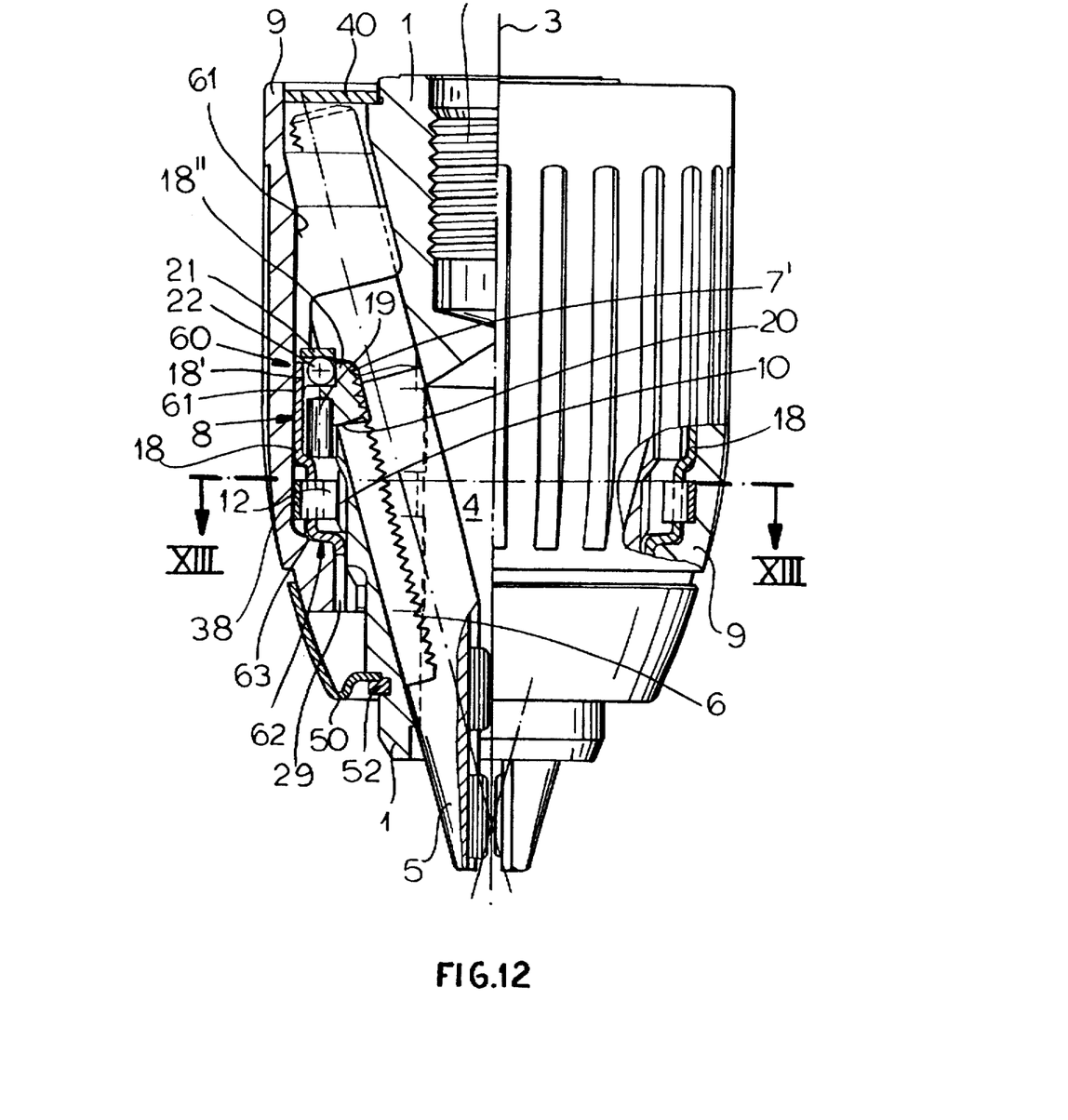
FIG. 12 is a view like FIG. 1 of a fourth embodiment of the chuck according to the invention.
Figure 13A:
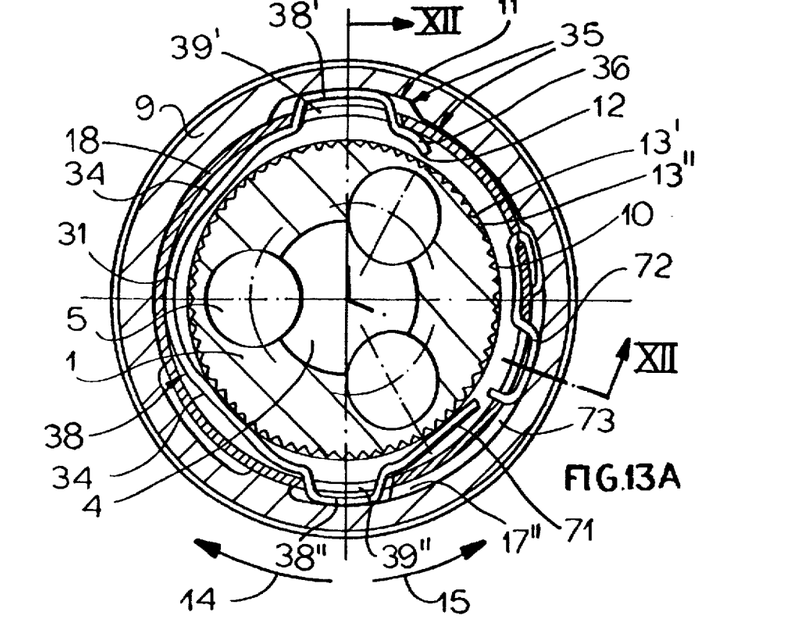
FIG. 13A is a section taken along line XIII—XIII of FIG. 12.
Figure 13B:
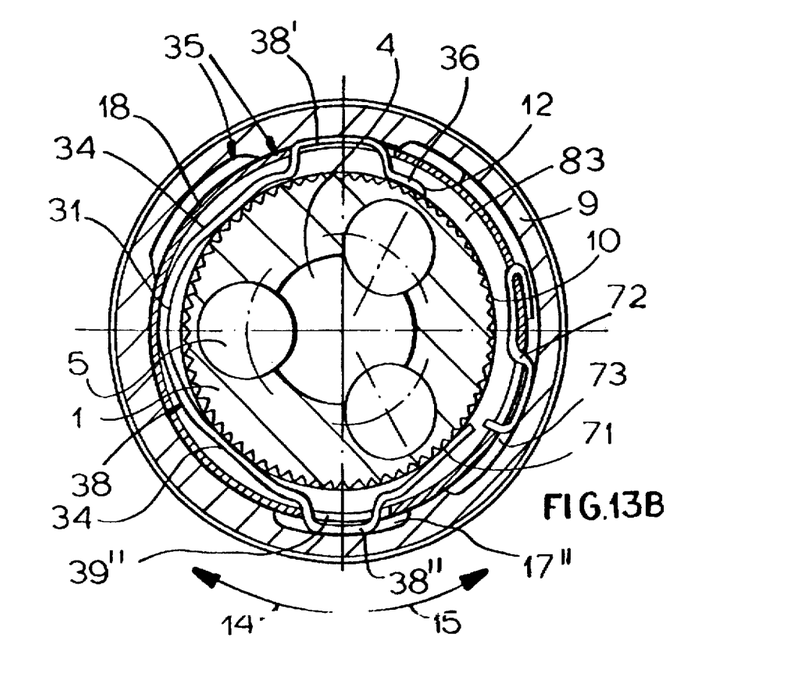
FIG. 13B is a view like FIG. 13A but showing the chuck in the locked position.
Figure 14:
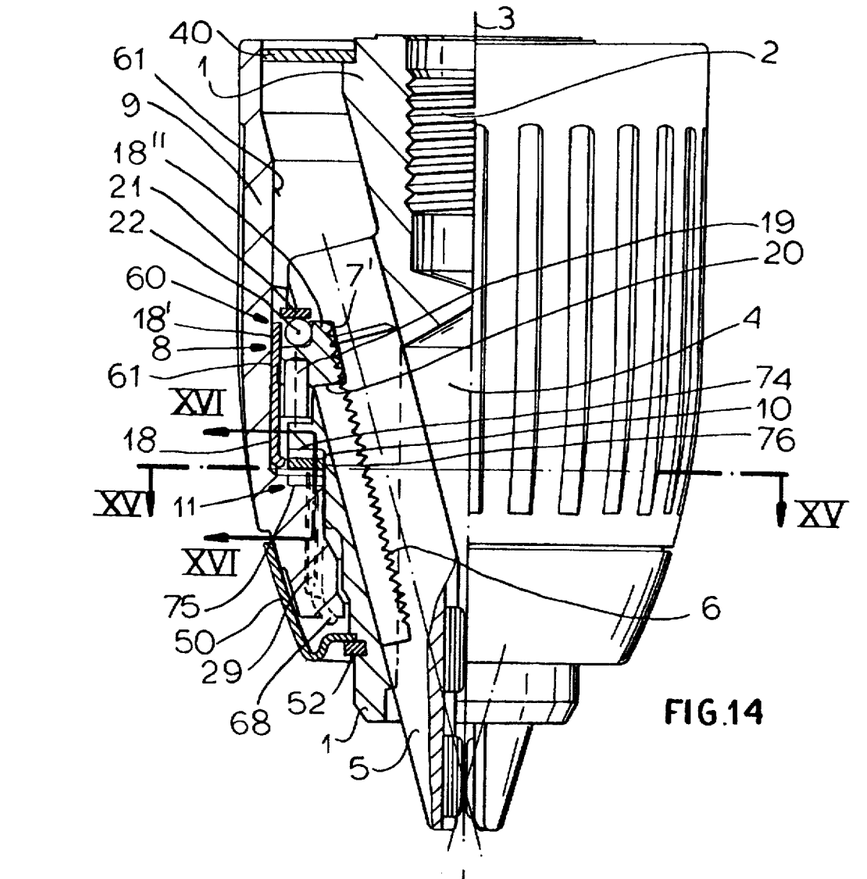
FIG. 14 is a view like FIG. 1 of a fifth embodiment of the chuck according to the invention.
Figure 15:
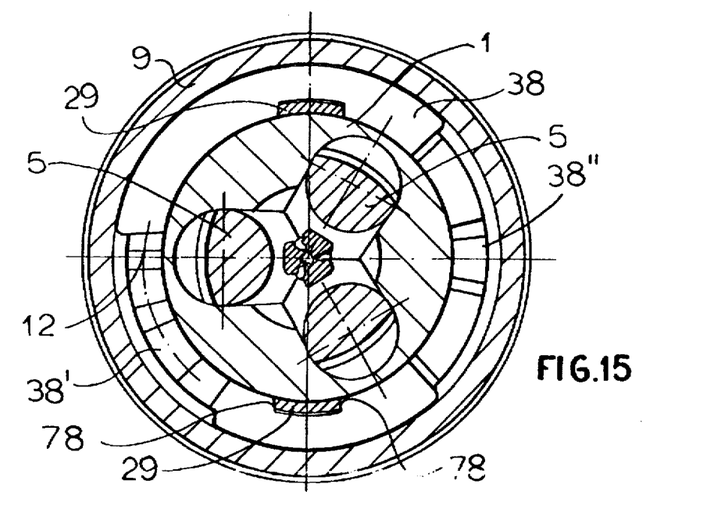
FIGS. 15 and 16A are sections taken along respective lines XV—XV and XVI—XVI of FIG. 14.
Figure 16A:
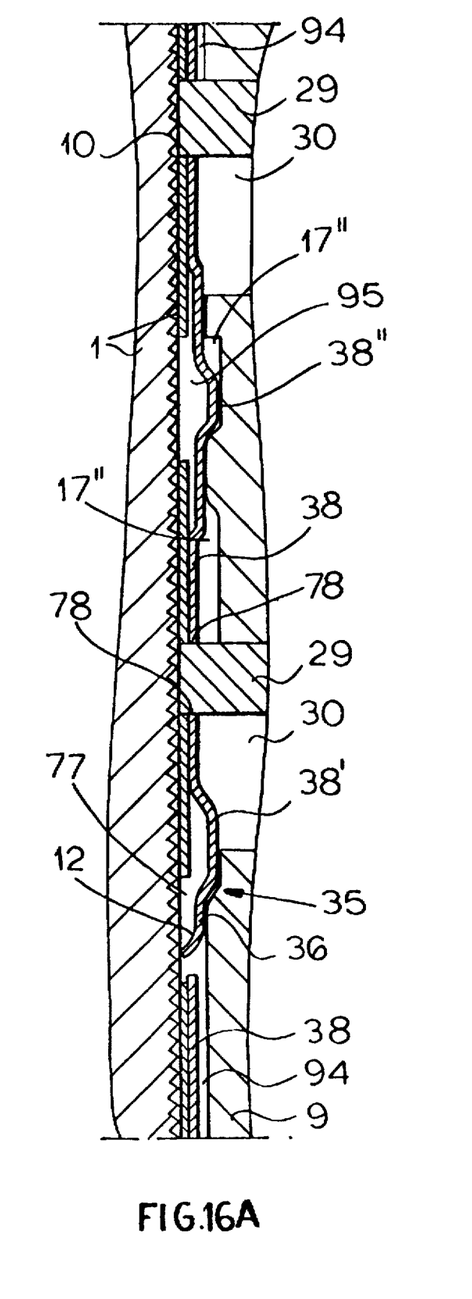
Figure 16B:
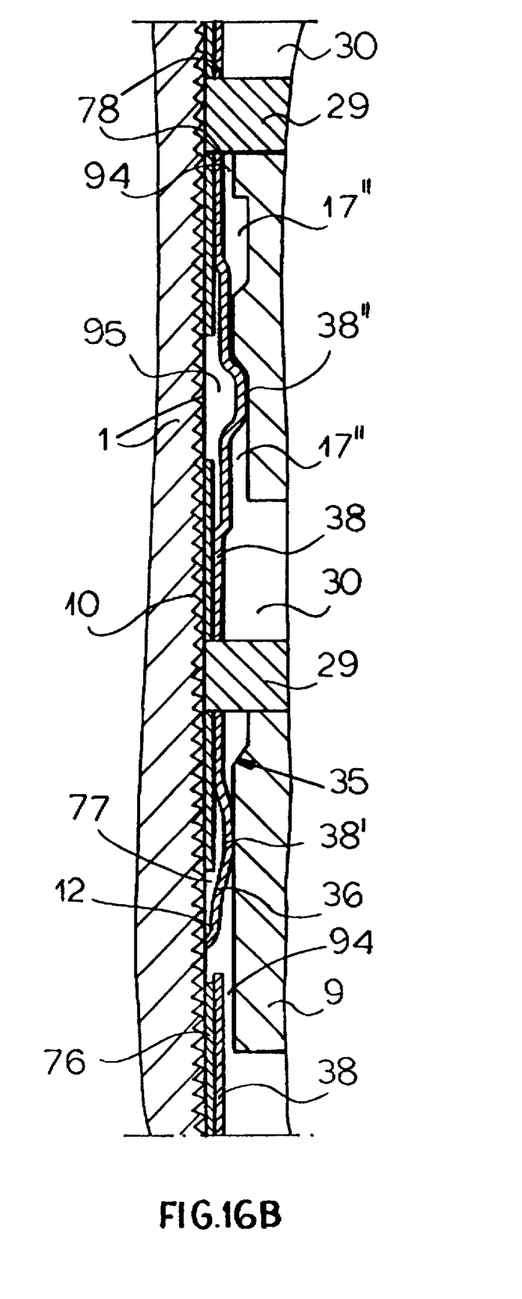
FIG. 16B is a view like FIG. 16A but showing the chuck in the locked position.
Figure 17:
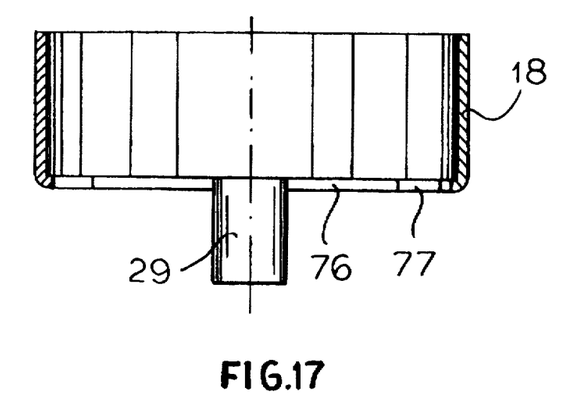
FIG. 17 is an axial section through a detail of the chuck of FIG. 14.
Figure 18:
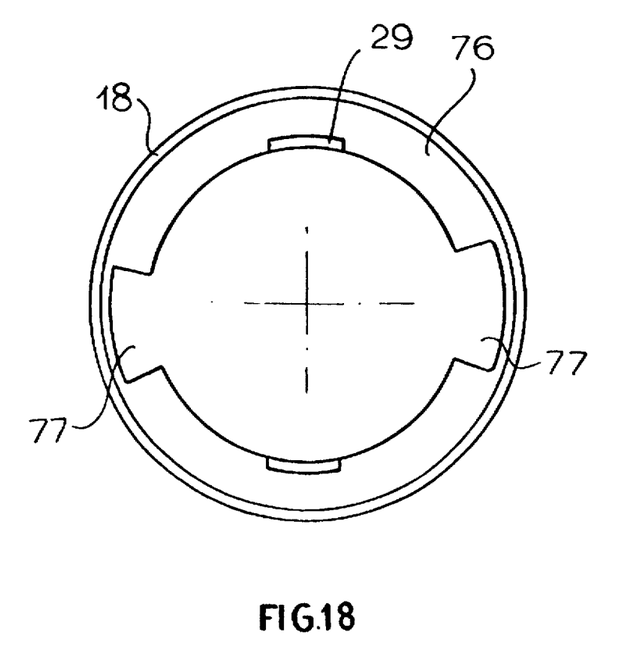
FIG. 18 is an end view of the detail of FIG. 17.

FIGS. 12, 4A, and 4B shown another chuck where instead of the groove 70 and projection 38'" the sleeve 18 is provided with a spring clip 27 received in a radially inwardly open groove 73 formed in the setting sleeve 9. This clip 27 retains the setting sleeve 9 against axial shifting on the sleeve 18.

In FIGS. 14 through 18 the sleeve 18 is formed with a radially projecting step 76 lying in a plane perpendicular to the axis and projecting in a slot or space 94 between a shoulder 74 of the body 1 formed with the axially projecting teeth 10 and a shoulder 75 of the setting sleeve 9. The spring 38 lies in the angularly extending slot or space 94. The wall of the tightening ring 8 is formed with a window 77 through which the locking member 12 engages in the teeth 10. In addition the space 94 has an enlarged portion 95 forming a seat for the member 38". The cam 35 and the seat 17" are formed on the shoulder 75 while the window 77 for the member 12 and the enlargement 95 for the member 38" are formed on the flange 76. The sleeve 18 extends with its projects 29 through the spring 38 at windows whose edges 73 angularly engage the projections 29 so that the spring 38 cannot rotate relative to the sleeve 18 and the tightening ring 8.

Figure 19:
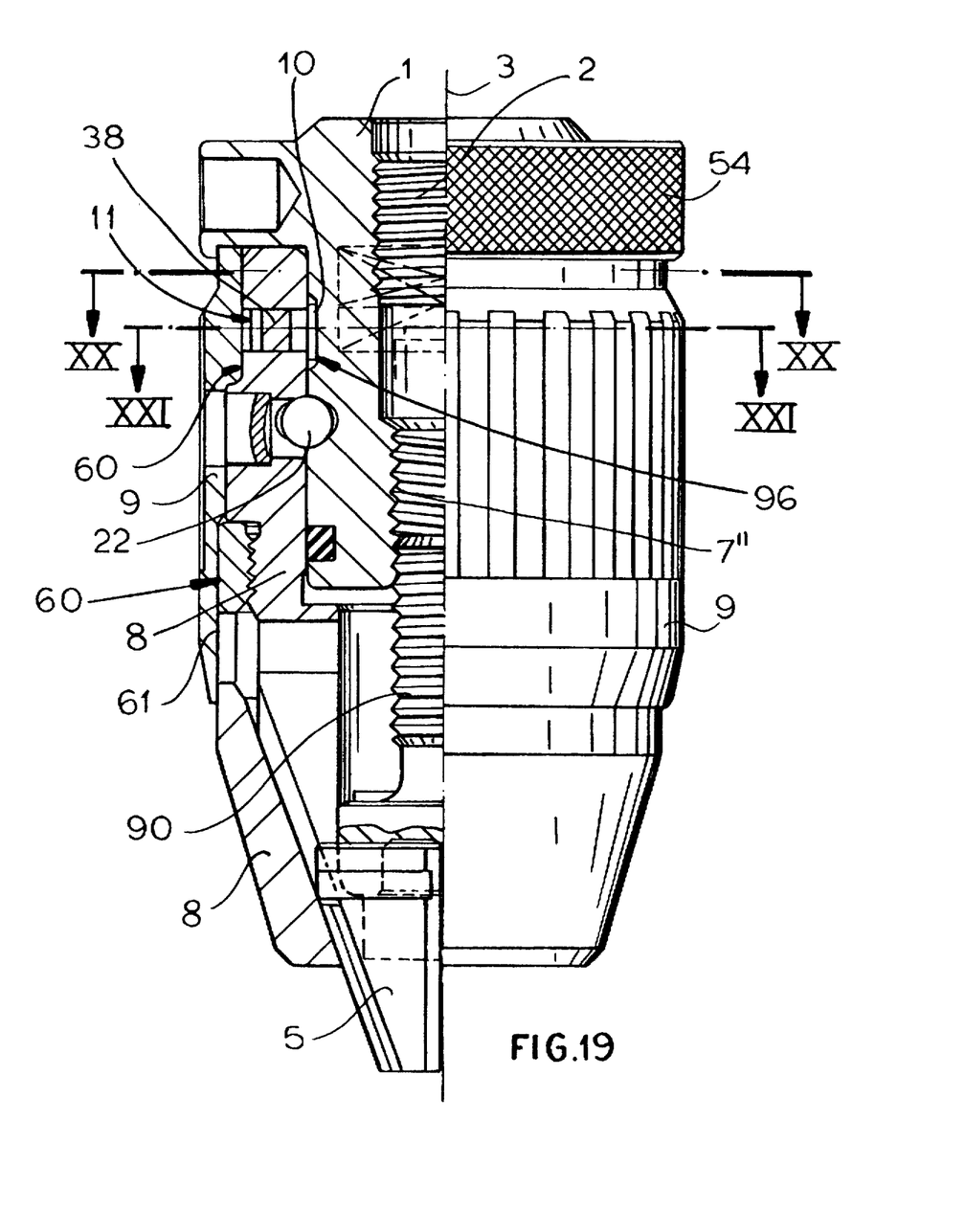
FIG. 19 is a view like FIG. 1 of a sixth embodiment of the chuck according to the invention.
Figure 20:
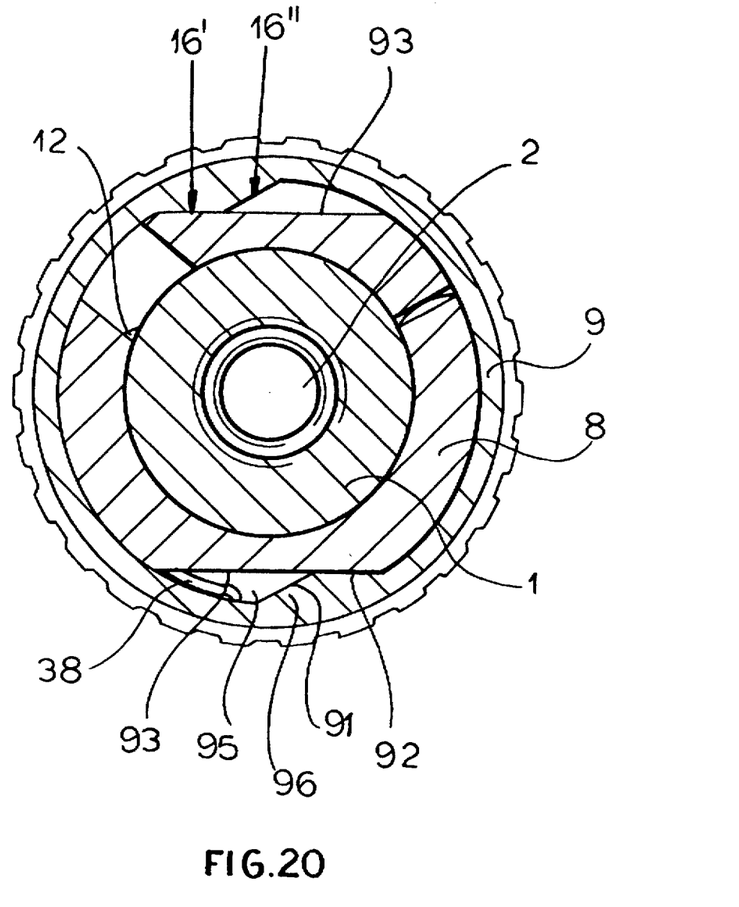
FIGS. 20 and 21A are sections taken along respective lines XX—XX and XXI—XXI of FIG. 19.
Figure 21A:
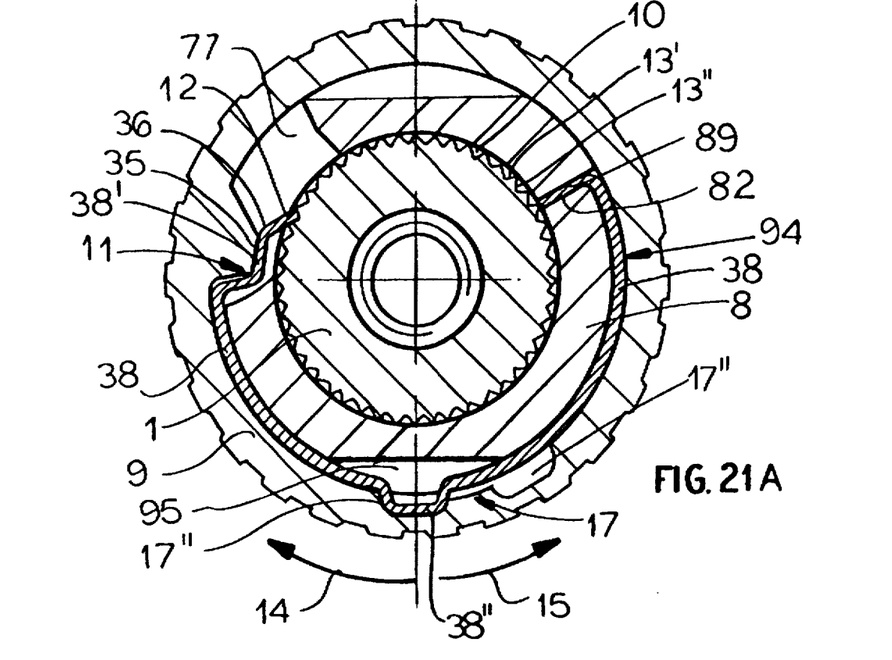
Figure 21B:
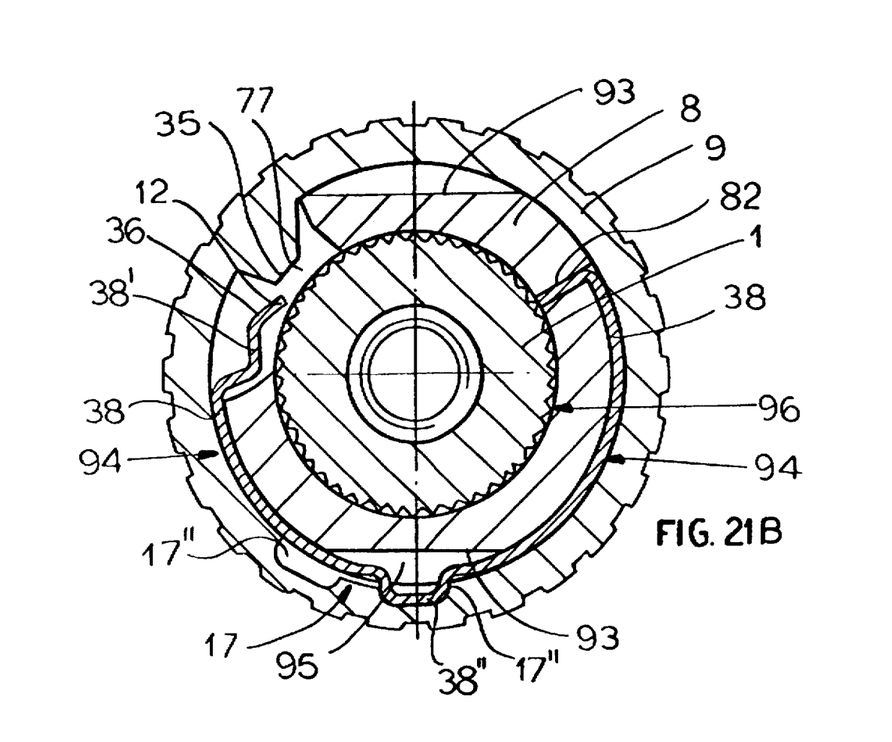
FIG. 21B is a view like FIG. 21A but showing the chuck in the locked position.

FIGS. 19 through 21B depict a system where the tightening ring 8 is formed with a pair of diametrically oppositely directed planar flats 93 that can fit with opposite flanks 31 and 92 of inwardly projecting V-shaped teeth 96 formed on the setting sleeve 9 and forming the abutments 16' and 16". In addition here the spring 38 has a bent-in end 82 fitting in a radially extending slot or hole 82 formed in the tightening ring 8 to fix the spring 38 angularly on the tightening ring 8. A cylindrical inner surface 96 of the tightening ring 8 rides on the teeth 10. Here also as shown in FIG. 19 the spindle bore 2 is formed internally with a screwthread 7" acting on a rear end of a tool-holding assembly 90 carrying the jaws 5. This is a self-tightening chuck and the rear end of the body 1 is formed with a milled grip ring 54.

I claim:

1. A drill chuck comprising:
    a chuck body rotatable about a chuck axis and provided centered on the axis with an annular array of teeth each having a steep flank and a shallow flank;
    a plurality of jaws angularly spaced on the body about the axis and radially displaceable relative to the body between inner and outer positions;
    a tightening ring axially fixed but rotatable about the axis on the body in a tightening direction and in an opposite loosening direction;

means including a pair of screwthread formations between the tightening ring and the jaws for moving the jaws radially together on rotation of the tightening ring in the tightening direction and for moving the jaws radially apart on rotation of the tightening ring in the loosening direction;

a locking member engageable with the teeth and angularly fixed on the tightening ring, the member being radially displaceable between a locking position engaging the teeth and preventing rotation of the body relative to the tightening ring in the loosening direction and a freeing position permitting free rotation of the body relative to the tightening ring in both directions;

a setting ring axially fixed but angularly displaceable on the tightening ring and formed with a pair of angularly spaced and radially open seats;

means including a pair of angularly spaced abutments between the setting ring and the tightening ring for limiting angular movement of the sleeve on the ring to movement between a pair of end positions of the sleeve on the ring;

means including a cam on the setting ring engageable with the locking member for displacing the locking member into the locking position when the setting ring is in one of its end positions and for displacing the locking member into the freeing position when the setting ring is in the other of its end positions;

latch means including a latch member angularly fixed on the tightening ring and engageable in the seats of the setting ring for releasably retaining the setting ring in its end positions; and a common spring extending angularly along and fixed angularly in the tightening ring and urging the latch member into the seats and the locking member into the freeing position.

2. The drill chuck defined in claim 1 wherein the locking ring is formed directly with one of the screwthread formations and includes a sleeve carrying the common spring and engageable directly with the abutments.

3. The drill chuck defined in claim 2 wherein the locking ring is formed of at least two part-circular pieces joined together and fixed to the locking-ring sleeve.

4. The drill chuck defined in claim 1 wherein one of the rings is formed with at least one secantal flat and the other ring is formed with a radial projecting having opposite flanks forming the abutments and engageable with the flat.

5. The drill chuck defined in claim 1 wherein one of the rings is formed with a radially open notch having ends forming the abutments and the other ring has a projection extending into the notch and engageable with the ends thereof.

6. The drill chuck defined in claim 5 wherein the projection extends axially forward from the locking ring.

7. The drill chuck defined in claim 5 wherein the projection extends radially inward from the setting ring and the notch is formed as a window in the tightening ring.

8. The drill chuck defined in claim 1 wherein the common spring has one end forming the locking member.

9. The drill chuck defined in claim 8 wherein the common spring has a pair of lateral projections one of which is adjacent the locking-member end and engageable with the cam and the other of which is engageable in the seats.

10. The drill chuck defined in claim 9 wherein the spring is formed as a single strip of spring steel.

11. The drill chuck defined in claim 10 wherein the rings together form an angularly extending space holding the spring and the tightening ring is formed with a radially throughgoing window through which the locking member extends to engage the teeth.

12. The drill chuck defined in claim 11 wherein the teeth project axially from the chuck body.

13. The drill chuck defined in claim 11 wherein the teeth project radially from the chuck body.

14. The drill chuck defined in claim 11 wherein the locking ring forms a flange extending in a plane perpendicular to the axis and formed with a window through which the locking member engages.

15. The drill chuck defined in claim 14 wherein the window has edges constituting the abutments.

16. The drill chuck defined in claim 9 wherein the rings form at the teeth an angularly extending space in which the spring is lodged, the spring being tensioned to bear at its ends inward on the body, at its projections outwardly on the setting ring, and centrally between its ends outwardly on the setting ring.

17. The drill chuck defined in claim 16 wherein the locking ring has an axially extending sleeve formed with windows through which the projections extend and that angularly couple the spring to the locking ring.

18. The drill chuck defined in claim 17 wherein the spring is formed centrally between its ends with another projection and the locking-ring sleeve has another such window snugly surrounding the central projection.

19. The drill chuck defined in claim 17 wherein the space extends annularly around the chuck body, the chuck further comprising a clip fixed on the locking-ring sleeve angularly offset from the spring and engaged in the space.

20. The drill chuck defined in claim 16 wherein the teeth project radially outward toward the space.

* * * * *